(12) United States Patent
Volkov

(10) Patent No.: US 11,358,329 B2
(45) Date of Patent: Jun. 14, 2022

(54) METHOD AND DEVICE FOR THE ADDITIVE MANUFACTURING OF COMPONENTS

(71) Applicant: OBSCHESTVO S OGRANICHENNOY OTVETSTVENNOSTYU "ADIRUT", Moscow (RU)

(72) Inventor: Anatoly Evgenievich Volkov, Nizhnaya Salda (RU)

(73) Assignee: OBSCHESTVO S OGRANICHENNOY OTVETSTVENNOSTYU "ADIRUT", Moscow (RU)

( * ) Notice: Subject to any disclaimer, the term of this patent is extended or adjusted under 35 U.S.C. 154(b) by 297 days.

(21) Appl. No.: 15/756,547

(22) PCT Filed: Sep. 8, 2016

(86) PCT No.: PCT/RU2016/000616
§ 371 (c)(1),
(2) Date: Feb. 28, 2018

(87) PCT Pub. No.: WO2017/052417
PCT Pub. Date: Mar. 30, 2017

(65) Prior Publication Data
US 2018/0290381 A1 Oct. 11, 2018

(30) Foreign Application Priority Data
Sep. 25, 2015 (RU) ............................ RU2015141052

(51) Int. Cl.
 B29C 64/188 (2017.01)
 B33Y 10/00 (2015.01)
(Continued)

(52) U.S. Cl.
 CPC ............ *B29C 64/188* (2017.08); *B22F 12/00* (2021.01); *B23K 15/0086* (2013.01);
(Continued)

(58) Field of Classification Search
 CPC ... B29C 64/112; B29C 64/153; B29C 41/006; B29C 64/329; B29C 64/106
See application file for complete search history.

(56) References Cited

U.S. PATENT DOCUMENTS 4,724,299 A * 2/1988 Hammeke ............. B05B 7/1486
 219/121.6
6,122,564 A * 9/2000 Koch ..................... B23K 26/32
 700/123
(Continued)

FOREIGN PATENT DOCUMENTS

RU 2 132 761 7/1999
RU 2 228 243 5/2004
(Continued)

OTHER PUBLICATIONS

A. A. Fogel—Induction Method of Liquid Metal Suspension / edited by A.N. Shamov—Ed. 2, amended—L.: Mashinostroenie, Leningrad Division, 1989, (p. 167; 174-181) (with Abstract).
(Continued)

*Primary Examiner* — Alison L Hindenlang
*Assistant Examiner* — Debjani Roy
(74) *Attorney, Agent, or Firm* — Nixon & Vanderhye PC

(57) ABSTRACT

The invention relates to the field of the additive manufacturing of components, which are formed by the direct deposition of a substance, in the form of granules of a metal or non-metal, which passes from a reservoir into a melt bath, produced by the thermal energy of a laser or electron beam, and subsequently crystallizes. The granules enter the melt bath without the intervention of a gas stream, the path and
(Continued)

rate of travel of said granules changing while they are in flight under the effect of an electromagnetic field. The granules travel within a chamber, falling into the melt bath from above from a reservoir, from which they are fed at a set speed by the rotation of an adjustable screw feed, and passing through a system of electromagnetic devices, which control the path of the granules by means of electromagnetic fields. The coordinates of this path are tracked by sensors, which transmit a signal to a computer, wherein the flight path of the granules is adjusted by control via the electronic devices and the delivery speed and volume of the substance is adjusted by adjusting the rotation of the screw feed. The invention increases the efficiency of the production cycle, reduces the dimensions of the equipment and increases the accuracy and speed with which material is delivered for the manufacture of a component, while enabling adjustment of the amount, temperature, path and fraction of said material and increasing the strength of the component.

8 Claims, 6 Drawing Sheets

(51) Int. Cl.

| | | |
|---|---|---|
| *B33Y 30/00* | (2015.01) | |
| *B22F 12/00* | (2021.01) | |
| *B23K 26/342* | (2014.01) | |
| *B29C 64/329* | (2017.01) | |
| *B29C 64/153* | (2017.01) | |
| *B23K 15/00* | (2006.01) | |
| *B23K 26/14* | (2014.01) | |
| *B22F 10/10* | (2021.01) | |

(52) U.S. Cl.
CPC ........ *B23K 26/1464* (2013.01); *B23K 26/342* (2015.10); *B29C 64/153* (2017.08); *B29C 64/329* (2017.08); *B33Y 10/00* (2014.12); *B33Y 30/00* (2014.12); *B22F 10/10* (2021.01); *B22F 2999/00* (2013.01); *Y02P 10/25* (2015.11)

(56) References Cited

U.S. PATENT DOCUMENTS

| | | | |
|---|---|---|---|
| 6,149,072 A | 11/2000 | Tseng | |
| 10,434,572 B2* | 10/2019 | Ljungblad | B29C 64/386 |
| 2001/0008230 A1* | 7/2001 | Keicher | B23K 26/1482 |
| | | | 219/121.84 |
| 2005/0288813 A1* | 12/2005 | Yang | B28B 1/001 |
| | | | 700/119 |
| 2011/0240607 A1 | 10/2011 | Stecker et al. | |

FOREIGN PATENT DOCUMENTS

| | | |
|---|---|---|
| RU | 139 624 | 4/2014 |
| SU | 779441 | 11/1980 |
| WO | WO 2005089090 | 9/2005 |

OTHER PUBLICATIONS

A. G. Grigoriants, A. I. Misurov—Capabilities and Prospects of Laser Clad Deposit. Engineering, 2005, No. 10 p. 52-56 (with Abstract).
A. M. Kulish, 4-th year student, Laser Processes in Engineering, Moscow State Technical University named after N. E. Bauman—Article. Use of Additive Processes for Engineering Component Manufacture, All-Russia R&D Student Conference Studencheskay Nauchnay Vesna 2015: Engineering (with Abstract).
International Search Report issued in Appln. No. PCT/RU2016/000616 dated Jan. 12, 2017.
O. F. Kabardin О.Ф.—Physics: Alloy. Materials: Student Text Book.—Ed. 4.—M.: 5 Prosveshenie: AO "Training Literature", 1996, (p. 3; 5-11) (with Abstract).
V. M. Dovbysh, P. M. Zabednov, M. A. Zelenko—Article. Additive Processes and Metal Products, [electronic] http://nami.ru/uploads/docs/centr_technology_docs/55a62fc89524bAT/_metall.pdf (with Abstract).
Zlenko M.A. et al. Additivnye tekhnologii v mashinostroenii, St. Petersburg, 2013, p. 58, 133 (with translation).
Office Action in CN App. No. 201680056127,2 dated Jun. 3, 2019 (w/ translation).
Examination Report in IN App. No. 201817009743 dated Aug. 19, 2020.
Extended European Search Report in EP App. No. 16849092.8 dated May 13, 2019.
Nowotny et al., Laser Beam Build-Up Welding: Precision in Repair, Surface Cladding, and Direct 3D Metal Deposition, Journal of Thermal Spray Technology 16(3): 344-348 (Sep. 2007).

* cited by examiner

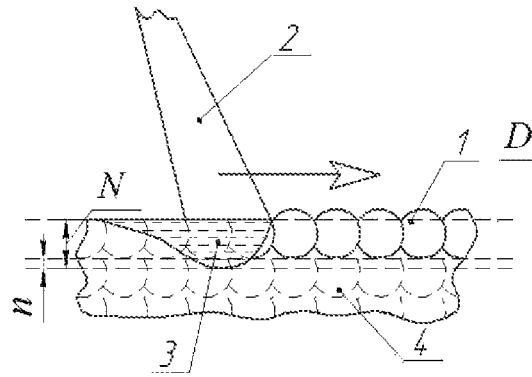
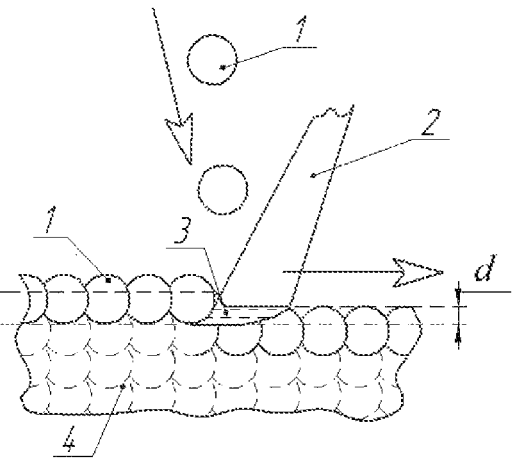
Fig. 1a  Fig. 1b
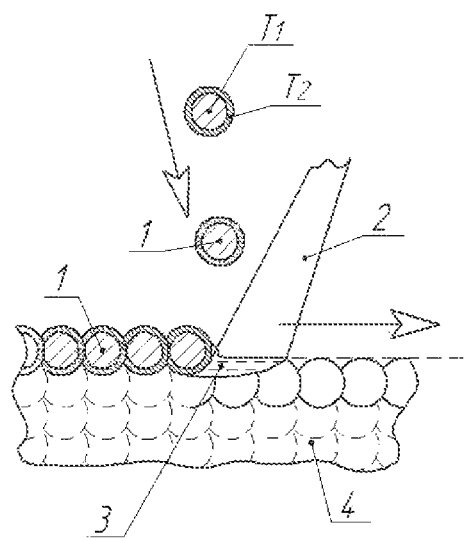
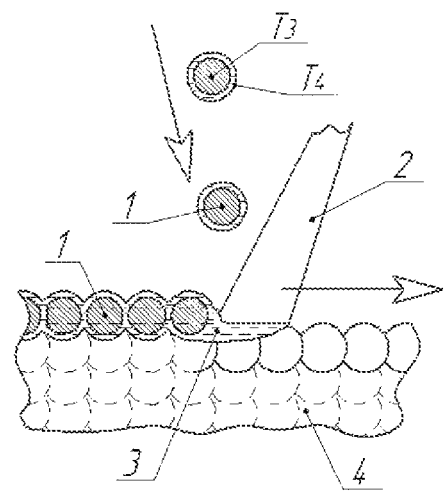
Fig. 1c  Fig. 1d
PRIOR ART

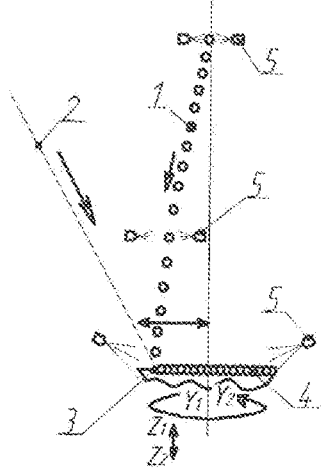 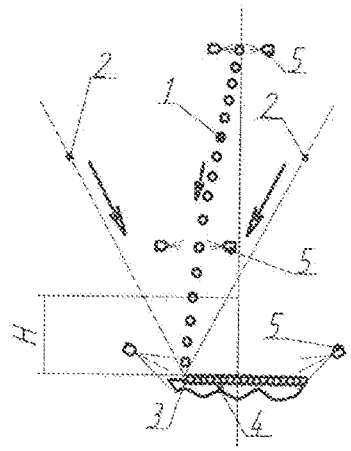 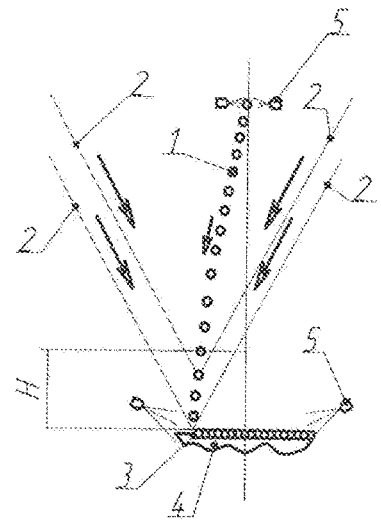
Fig. 2a  Fig. 2b  Fig. 2c
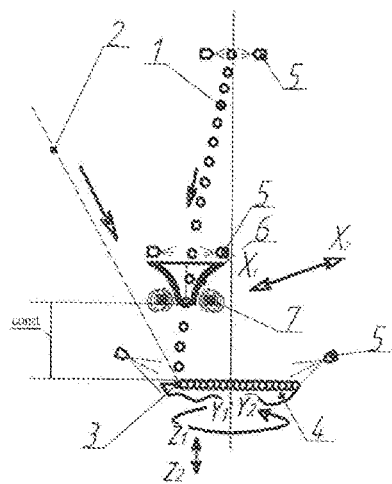 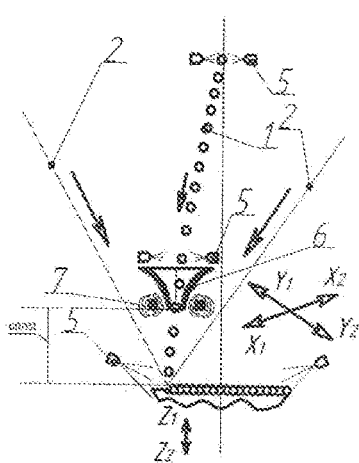 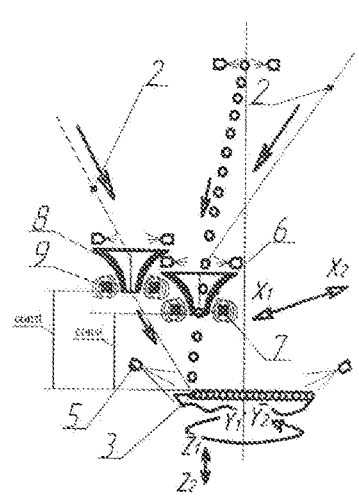
Fig. 2d  Fig. 2e  Fig. 2f

METHOD AND DEVICE FOR THE ADDITIVE MANUFACTURING OF COMPONENTS

This application is the U.S. national phase of International Application No. PCT/RU2016/000616 filed Sep. 8, 2016 which designated the U.S. and claims priority to Russian Patent Application No. 2015141052 filed Sep. 25, 2015, the entire contents of each of which are hereby incorporated by reference.

FIELD

The proposed group of inventions relates to additive manufacturing field and may be used for manufacturing of any components from metals, nonmetals as well as various material compositions.

BACKGROUND

[1]. Selective Laser Sintering (SLS) or Electron Beam Melting (EBM) are taken as prototype for the proposed invention where an object is formed from fusible powder material (plastic, metal, ceramic) by its melting under laser or electron radiation.

FIG. 1a shows the selective smelting process of powder (granules) 1, laminated over the plane in the form of rolls, which is selectively smelted by beam 2 of photons or electrons with the bath melt 3 generation with the depth of N. The bath melt penetrates the granule top layer and gets into the body of component 4 to the depth n, i.e. the top granule layer is fused with the bottom layer of previously melted granules representing the body of component top face.

Despite the significant advantages of the selective smelting there are a lot of problems related to obtaining of the required component properties [2]. Multiple research data demonstrate low engineering strength of grown components particularly nickel based. This involves cracking, cavitation and discontinuities related to the features of the deposited layer fracture at metal cooling.

Thus as a prototype for the proposed invention the direct material deposition process was taken with the layer formed with the material feeding into the bath melt area created on the body of component. Such process is implemented through a nozzle movement as per the model and both powder material and laser radiation delivered through it or the laser radiation delivered to the body of component while the powder material gets from the nozzle.

FIG. 1b shows the direct deposition process of granules 1, for which beam 2 preliminary forms a bath melt 3 at the body of component 4 top face. The granules get into the bath melt with the depth of d, and with the granule immersion into it the bath melt level rises from the bottom part to height D, seizing the granule. At subsequent fusing of top faces of granules, not immersed into the bath melt, a common area of remolten metal is generated and forms a circle around the granules, at that the granule volume may be completely melted or may be melted only at its surface. Thus the process requires no mandatory granule melting throughout the overall volume.

FIG. 1c shows the direct deposition process where the granules of different internal and external temperatures T1 and T2 with T2>T1 get into the bath melt. The process provides for the granule reheating at its approach to the bath melt thus allowing the process efficiency increase.

In FIG. 1d the granule approaching the bath melt is melted at the surface, at that the solid sphere with the temperature of T3 remains inside and a liquid shell with the temperature T4 is on the surface. When a melted granule gets into the pool it fuses with it easily, at that the bath melt and the melt around the granule fuse into a whole.

Advantage of the process is the possibility to use powder or granules as micro or macro crucibles. When getting into the bath melt the powder or granules capture the heat energy causing formation of fine crystalline structure in the body of component formation area. As a consequence this increases mechanical properties of the overall formed product. Vital difference from the selective smelting is the fact that overheating in the melt and temperature gradient are reduced due to material getting into the bath melt. As per the process the powder is immersed into the melt generated in the solid component upper layer and is smelted with it into a whole. The direct material deposition process allows using of more coarse powder or granules of not 20÷30 µm as at selective smelting, but of 200÷300 µm, for example. This allows simultaneous reduction of power production cost and increase of additive equipment efficiency. The granules obtained from the melt are miniingots with very fine grain or amorphous structure with high strength values. Thus remelting of the whole granule volume is not expedient. It causes considerable energy consumption and generation of large bath melt volume, where a more coarse grain structure is formed.

[3]. Currently the method with simultaneous powder material feeding and laser radiation through a nozzle or a separate nozzle was developed based on the direct deposition process, at that the component or the nozzle may be moved by a 3D-printer.

Regardless of all advantages of this fabrication option there are certain disadvantages, the major of which is material feeding into the bath melt through a nozzle with a gas flow. Due to this the amount of powder getting into the melt area is excess and some powder is smelted with the melt while some rebounds aside. The material is directed into the bath melt without a possibility of exact control for the amount of fed powder, its speed, each granule path direction, temperature as well as powder sorting by chemistry or granule size.

It is expedient to use vacuum causing no mechanical action on the substance as granule movement medium.

SUMMARY

The technical effect of at least one embodiment of the present technology as disclosed herein is increase of use efficiency and extension of technical capabilities through decrease in investments, energy consumption, reduction of manufacturing cycle and equipment overall dimensions, increased accuracy and speed of material feeding for the component fabrication with control of its amount, temperature, path, fraction and increased strength of a component produced by the additive method. These advantages are achieved through the use of electromagnetic fields for control of the beam and the substance forming the component in space.

More precise component construction with less energy and material consumption requires review of the deposition mechanism where the carrying and control agent will be represented by the electromagnetic field controlling the granule speed and movement path in vacuum rather than gas directed by the nozzle.

The proposed substance deposition method may be implemented in the air or in any gas, however use of vacuum causing no mechanical effect on the substance path is more expedient.

Use of an electron beam instead of a laser beam allows increased accuracy and melting rate of bath melt, at that the electron and granule paths will be controlled by electromagnetic field in vacuum. It is expedient to use electromagnetic field used to change the electron beam path in space as a mechanism effecting the granule path.

The material and beam control mechanism is revealed on the basis of electrodynamics [4] The method was proposed in 1923 by Otto Muck (Germany). Interaction forces of current induced in metal and electromagnetic field causing it are used. Due to it the metal may be raised over the inductor and thus the it may be heated and melted in suspension.

The depth of field penetration into the metal may be approximately determined by the formula:

$$\Delta = \sqrt{\rho/\mu\pi f},\qquad(1)$$

where f—field frequency, Hz; ρ—electrical resistivity Ohm*m; μ—metal magnetic permeability, H/m.

Due to induced current interaction with the field causing it mechanical forces exerting pressure on the metal appear in the metal surface layer. The resulting electromagnetic force acting from the side of the field may be directed opposite the gravity force and at quite high power delivered to the metal it may ensure the metal piece suspension. Electromagnetic pressure on the metal (Pa) at a pronounced surface effect of the field penetration into the metal is expressed by the formula:

$$\sigma = \mu H^2/4,\qquad(2)$$

where H—intensity range of magnetic field component on the metal surface, A/m.

Metal powders moved under the stress change between the condenser plates were used in Ioffe experiments.

[5] To move the metal powder it was illuminated with UV light so that it gets a positive or negative charge:

$$mg = qE,$$

where m—metal dust particle weight, g; g—gravity acceleration, m/sec$^2$; q—dust particle electric charge, coulomb; E—electric field intensity, V/m.

The objective is achieved by the fact that the proposed method consists in the body of component formation by direct deposition of a substance in the form of metal or nonmetal granules getting from a reservoir due to a gas flow directed by the nozzle into the bath melt generated by the heat energy of a laser or an electron beam with subsequent solidification, it is noted for the fact that the substance from the reservoir in the form of granules gets into the bath melt under the gravity and electromagnetic forces without a gas flow and with its inflight path and motion speed change as per the preset sequence under the electromagnetic field action, the granule substance may move in vacuum and when approaching the bath melt it may be reheated or melted on the surface due to independent melting sources which may be represented by electromagnetic fields or beams.

The substance approaching the bath melt may be remolten from the irregular shape powder into the spherical shape granules, at that the exterior may solidify at the granule deposition into the bath melt, while the interior may remain molten or vice versa; change of the granule flight pattern with respect to set points may be implemented through an alternating electromagnetic field causing electromagnetic induction in the granule.

Direct or alternating electromagnetic field may control the flight pattern of a nonmetal granule with no electromagnetic induction acquiring a certain positive or negative charge before falling; the bath melt may be generated by several beams while the granule flow getting into it may be of various chemistry and diameter getting into the bath melt as per the preset sequence.

An additive manufacturing device by direct deposition of substance in the form of granules comprise a laser or electron beam heating source, a reservoir for holding the substance reservoir, piping and a nozzle directing the substance into the bath melt, a support table for the body of component fixing and formation, a monitoring system and devices installed in the chamber, and is distinctive in the fact, that granules move in the chamber and fall into the bath melt from the reservoir on the top in certain volume and with certain speed due to the adjustable feed screw rotation and get through a system of electromagnetic devices controlling the granule path with electromagnetic fields; the path coordinates are monitored with certain frequency by instruments setting a signal via a switch box to a PC, where after the signal is processed as per the preset sequence the granule flight path is adjusted by control through electromagnetic units and the substance feed speed and volume are adjusted via the feed screw rotation regulation.

An inductor in the form of an electromagnetic funnel installed at a certain distance from the table is used instead of a nozzle; it directs the granules in the electromagnetic field into the bath melt and is moved in space by a mechanism as per the preset computer program; not only the granule path is controlled in the electromagnetic field of the funnel installed over the bath melt and controlled by the movement mechanisms as per the program in accordance with the set points before its falling into the bath melt, but also the granule flow cross section area. If an electromagnetic deflecting contour is used downstream the funnel the substance may be laid into the bath melt at any angle with change of the flight pattern geometry to a set radius and any direction change possible including the reorientation to the starting position, the substance falling pattern is formed under the electromagnetic field and monitored throughout the complete movement path by the instruments which may function as a radar, scanner, pyrometer or spectrometer when required.

The device may use the electromagnetic deflecting contour without the use of the electromagnetic funnel, what allows granule laying into the bath melt due to electromagnetic field in certain space and change its falling pattern as per the preset curve with the possible path reorientation to the starting position, funnel and contour movement is ensured by a single mechanism which according to the program moves them on the set points in the solid component construction space; jointly with the electromagnetic funnel and contour through which the granules are fed the electromagnetic funnel and the contour through which the electron beam melting the bath melt are used and moved according to the set points with a single mechanism, what allows exact coordination of the bath melt and substance falling locations, at that the bath melt may be melted and the substance may be deposited into it from the top, from the side, from the solid component bottom, allowing formation of closed honeycomb structures without the solid component tilting.

Through a support table rotation and its movement up or down along the rotation axis, the granule falling and the pool melting may be carried out straight along the rotation radius creating the solid component formation in a preset volume, where the granules are fed normal to the rotation plane and the radiation is inclined, what allows constraint of the solid component formation area in a certain sector.

The device may use several reservoirs from which the required amount of granules with various chemistry and size gets at the required moment of time, the device does not use the body of component movement, at that several beams are used and control focusing on the preset height where the solid component is formed through the granule and the beam falling pattern change under electromagnetic field with no mechanisms used.

Granule feeding from a reservoir may be ensured with a vibratory chute, sand glass with a magnetic lock, hopper tilting and other similar mechanisms, the granules falling from the reservoir get into the piping with electromagnetic coils with various winding diagrams, what allows establishing of a stabilized granule flow along the preset paths in the piping volume and the granule quantity and speed determination through the instrument registration of the field intensity variation in the spool electromagnetic contour; a focusing and deflecting inductors are installed downstream the distributor and instruments reading all parameters describing the granule movement and heat condition installed before and after them; the focusing inductor may focus, slow down, speed up or change the temperature of the granule flow, while the deflecting inductor may direct the required granule flow into the bath melt or back to the reservoir.

Information on the granule flow and the beam is registered by sensors with certain frequency from the moment of falling from the reservoir to the moment of deposition into the bath melt, processed by software with the same frequency and corrections for control of all devices, effecting the additive process of the component fabrication; more focusing, deflecting, decelerating, accelerating electromagnetic devices, and electromagnetic devices sorting the substance are used for higher accuracy of granule control; they are installed between the focusing and the deflecting inductors and may include the electromagnetic divider, circular electromagnetic funnels, collecting and accelerating—decelerating inductor with every electromagnetic device equipped with sensors to to monitor at a set frequency path coordinates of the substance and/or laser or electron beam heating source.

Certain positive or negative charge may be acquired by granules through friction, radiation or direct electron or proton approach to the substance, vertical or horizontal condenser plates combined into a grid structure arranged in rows with various intensity created between the two plates may be used to control the charged particle; the structure functions as a device sorting and controlling the granule speeds and paths, equipped with monitoring instruments; the component additive fabrication rate is increased by the substance deposition at several deposition sectors or areas simultaneously.

BRIEF DESCRIPTION OF THE DRAWINGS

FIG. 1a shows the selective smelting process of powder (granules), laminated over the plane in the form of rolls, which is selectively smelted by a beam of photons or electrons with the bath melt generation with the depth of N.

FIG. 1b shows the direct deposition process of granules, for which a beam preliminary forms a bath melt at the body of a component's top face.

FIG. 1c shows the direct deposition process where the granules of different internal and external temperatures T1 and T2 with T2>T1 get into the bath melt.

FIG. 1d shows the granule approaching the bath melt being melted at the surface.

FIGS. 2a-2f show major proposed manufacturing method of components with direct granule deposition into the bath melt created by a beam, where the substance falling path is formed under electromagnetic field and monitored throughout the movement path by sensors.

DETAILED DESCRIPTION OF THE NON-LIMITING EMBODIMENTS

Figure 3:
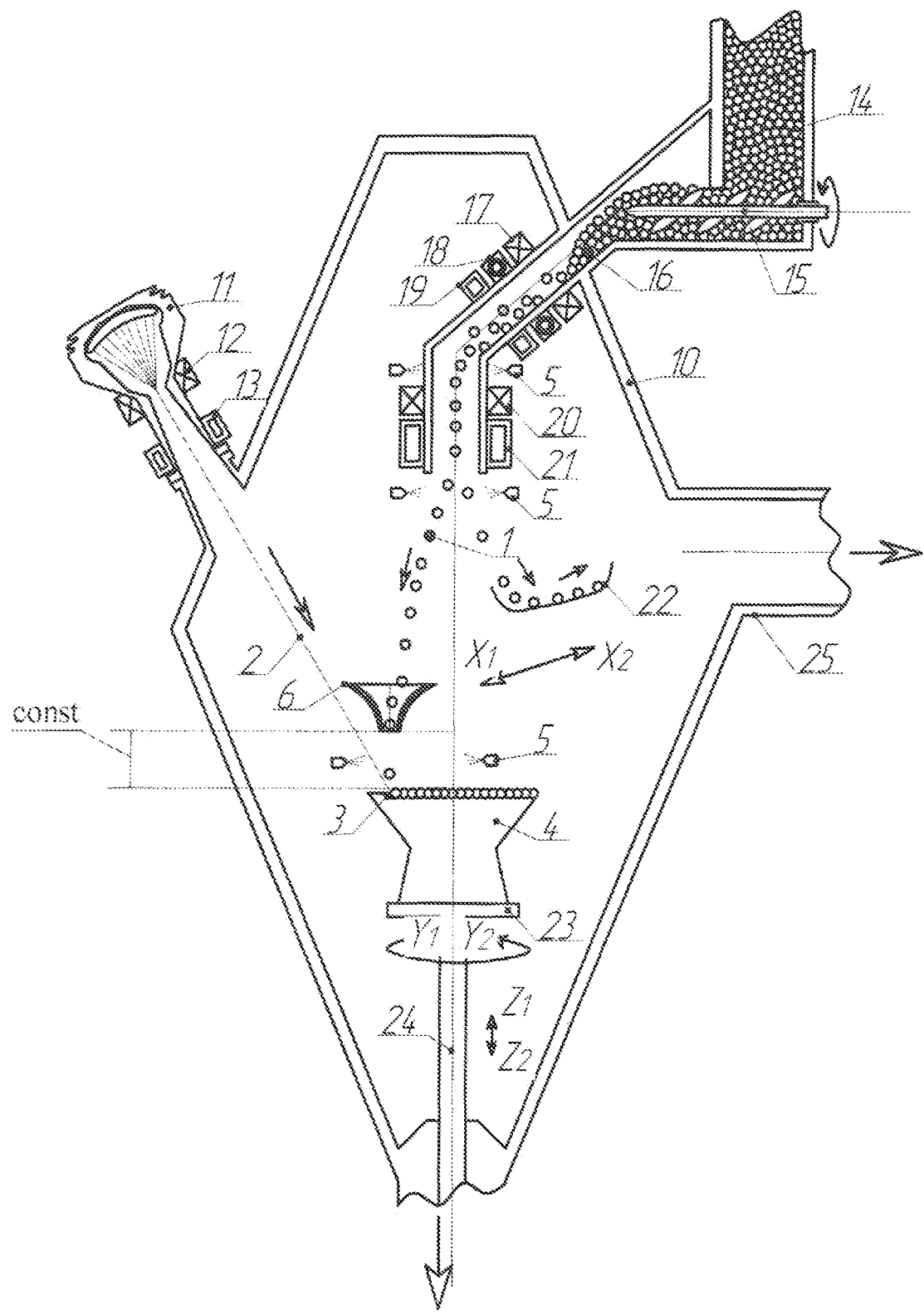
FIG. 3 is a device for implementing an additive component fabrication method based on electrodynamics.

The declared additive component fabrication method and the device for its implementation are interrelated by a common invention design and are illustrated by the following examples of specific application.

FIGS. 2a-2f show major proposed manufacturing method of components 4 with direct granule 1 deposition into the bath melt 3 created by beam 2, where the substance falling path is formed under electromagnetic field and monitored throughout the movement path by sensors 5, which, when required, may function as a radar, scanner, pyrometer, spectrometer, etc.

FIG. 2a shows the process employing one beam 2 creating the bath melt 3 in the body of component 4 formed by granules 1 due to falling from a certain height under gravity force and controlled by electromagnetic fields. Sensors 5 are installed along the granule movement path; they determine the granule coordinates at certain moment of time, its speed, direction, temperature and other required parameters with certain frequency as well as the location of the granule attachment to the body of component.

Body of component formation in 3D space is ensured by its rotation and moving down as the layers are formed. Due to this the granules are falling straight along the rotation radius with the movement direction changing from the rotation center to periphery and back. For ex. granules are fed in X direction along the rotation radius, the solid component is moved in Y direction due to turning around the rotation axis to certain angle and the solid component is raised and lowered to a certain value along the rotation axis in Z direction. Thus a mechanism of the component formation working as per the 3D printer principle is created. Such mechanism is used in machining equipment when creating components where, for example, transverse feeding is used in X direction, the component is turned in Y direction and longitudinal feeding is used in Z direction.

In the proposed invention the process of the body of component formation allows granule direction along the straight line normal to the rotation plane and the radiation from a certain site and at a certain angle, what allows constraint of the body of component formation area by a certain window. The window relative to the overall component section may comprise only several per cents. This feature allows high accuracy component formation.

In FIG. 2b no movement of the formed body of component is used in the proposed device design. Several (two, three, four and more) beams 2 are used for quality and thorough melting of bath melt and they may control the focusing at height H, where the body of component is formed.

The process is different in that the component is formed in space by direct substance deposition changing the granule falling path and the electron beam focusing and path under electromagnetic field with no mechanisms used.

In FIG. 2c the component forming process is similar to the previous one, however additional reheating or surface melting of granular powder or granules by a separate beam or beams at the substance approach to the bath melt may be used.

The process allows use of cheaper granular powder which conglobates after surface melting. The process allows the substance temperature control at the approach to the bath melt. The granule falls into the bath melt and acquires the set temperature, at that its surface may be melted while the central portion may be not melted and vice versa.

In FIG. 2d for the initial try-out of the proposed process the use of an electromagnetic funnel 6 is possible, it entraps the granules and directs them along its axis into the bath melt, i.e. adjusts the granule falling path more precisely through the path adjustment in the funnel electromagnetic field.

To adjust the movement path of the granules with a positive or negative charge direct electromagnetic field may be used. In the alternating field the path and heating may be adjusted for the granules having no charge but conducting current. Through variation in the electromagnetic field intensity focusing or unfocusing is possible for the flow of granules along the electromagnetic funnel axis. The process may be used in the modification where the granules may be directed into the bath melt by an electromagnetic deflecting contour 7 installed directly after the funnel and allowing granule laying into the bath melt at a certain radius from the funnel axis. To create special components consisting of closed honeycomb cavities the deflecting contour allows changing of the granule flow where the falling path on the solid component may be horizontal or follow the curve with reorientation to the starting position, i.e., the contour may allow the substance deposition into the bath melt at any fall angle. Consistent use of the funnel and the contour increases the granule laying accuracy and area and therefore the component formation rate. The deflecting contour allows more dynamic effect on the granules, thus improving the process rate.

When an electromagnetic funnel is used, FIG. 2d, it is expedient to use the process similar to that shown in FIG. 2a, where the body of component rotates about its axis and moves down as builds up and the funnel with the contour moves along the straight line, i.e. along the rotating radius. The funnel and the contour movement is ensured by the mechanism which according to the program moves them along the straight line and positions at set points. When the proposed mechanism is used the pool melting and the substance deposition in the course of the component formation take place in a certain angular sector.

FIG. 2e suggests a device design where the body of component rotation is not used, at that the mechanism of the body of component movement up or down along the vertical axis as the layers are smelted is used.

To ensure quality pool fusing several beams 2 may be used, at that the electromagnetic funnel 6 and the electromagnetic deflecting contour 7 are moving in the same plane parallel to the upper layer formation plane along X and Y axes through the use of a 2D printer. The area of the circle where the granules are deposited through the use of a deflecting contour exceeds that of the granule falling, where only one electromagnetic funnel is used, thus the funnel and the contour movement along the component cross section may be smoother and to a shorter distance.

In FIG. 2f the process used is similar to that shown in FIG. 2a where rotation with the component moving down as the layers are built up is also used.

To ensure the more accurate setting to the beam pool melting location the second electromagnetic funnel 8 is used; it has the second electromagnetic deflecting contour 9 attached to it in the bottom part. The second electromagnetic funnel 8 focuses beam 2 and directs it along the internal axis and the second electromagnetic contour 9 directs the beam to the required location of the bath melt. This allows electron beam direction along a more complicated path relative to the solid component—both tangentially and along the curved path including the path reorientation to the beam origin location. This feature allows manufacture of honeycomb hollow components with closed cavities; to do it the beam path shall be bent as well as that of the substance falling at a set angle. At that the bath melt may be melted not only on the top of the body of component, but also from the side and from the bottom, i.e. the pool may be melted on the body of component horizontally from the top, vertically form the side and horizontally from the bottom. Closed cavities with the shape close to the ball shell require the pool melting and the substance deposition from various directions in space. The method capability to direct the substance and the beam path into the required location in space, despite the gravity forces, under the electromagnetic fields without any mechanisms provides significant process advantages.

The second electromagnetic funnel 8 with the second electromagnetic contour 9 are fixed to the electromagnetic funnel 6 and the electromagnetic contour 7 and move for a stationary distance. This feature allows very precise location coordination for the bath melt by the beam and the path of granules falling into it.

Additional beam 2 directed into the electromagnetic funnel 6 or to the substance movement path may be used for reheating of granules 1 and pool 3 heating up. When passing through the substance path and the funnel axis the beam reheats the granule surface and the bath melt. Such device is particularly efficient in case of construction of new additive equipment using the method of simultaneous beam and substance control by electromagnetic field.

If required the component tilting in space or tilting of the component rotation axis may be used. Major deposition processes shown in FIGS. 2a-2f may be grouped in different combinations for construction of various equipment modifications.

To implement the claimed additive component fabrication method based on electrodynamics the device shown in FIG. 3 is proposed. The device contains a vacuum chamber 10 with an electron beam gun 11 having a focusing electromagnetic lens 12 and a deflecting electromagnetic lens 13 of beam 2, which melts the bath melt 3 at the set point on the body of component 4 top face in the construction zone and the powder in the form of spherical granules 1 gets into it falling with certain speed from a loading hopper 14. The granules are pushed out of the hopper with a feed screw 15, which may rotate with a preset speed. By controlling the rotation speed a certain volume of granule feed per second may be ensured. The granule feed may be ensured by various mechanisms, i.e. their feed from the hopper through a vibratory chute, as in sand glass where a magnetic lock may be installed in the narrow and it may slow down or speed up the substance flow, also other feeding systems may be used. The granules sent from the reservoir get into the dispenser 16 in the form of a tube. Induction electromagnetic coils 17, 18, 19 are installed on the dispenser to get the powder feed from the hopper in certain amount and with certain rate. The coils have various winding patterns, i.e. coil 17 winding is about the tube axis what allows the granule focusing in the tube center. The second coil 18 has transverse winding allowing granule deflection along the pipe cross section. The third coil 19 winding is at an angle to the pipe axis, what allows the granule distribution at an angle to the pipe section. Due to interaction of the induced current in the granule metal with the coil field causing it mechanical forces exerting pressure on the granule metal emerge and distribute them among the desired paths in the piping volume.

Granules getting into the induction coil coverage causes variation of the field intensity in the electromagnetic contour registered by the instruments; through it an approximate amount and rate of the fed powder may be determined. The coil field intensity and the feed screw drive rotation rate may be computer controlled with a certain software via a feedback switch box. When a signal is taken from the induction coil on the certain substance amount getting into it, it gets to the switch box and then to the computer which determines the amount correspondence of the fed in powder as per the software. After comparing the signal gets via a switch box to the feed screw rotation and coil field intensity control device and feeding of the predetermined substance amount into the dispenser is achieved. After that the rate, direction and quantity stabilized granule flow is established as per the software which gets into the focusing inductor 20 and deflecting inductor 21 coverage area.

Sensors 5 are installed at the dispenser 16 output, they register all parameters describing the granule movement and thermal state more accurately, the gathered information via the switch box gets to the computer, is processed and the control signal again via the switch box is set to the focusing inductor 20 and deflecting inductor 21. Under the control signal the focusing inductor 20 may speed up or slow down the granules, focus the path along the axis and change the temperature, while the deflecting inductor 21 directs the granules into the electromagnetic funnel 6 or electromagnetic trap 22, from which the granules may get into hopper 14 again. This design allows exact control of amount, rate, path, temperature and other parameters of granules getting into the electromagnetic funnel 6. The mechanism moves the funnel on X axis at the certain straight line section and at a certain moment gets a computer signal on the coordinates. Upstream and downstream the electromagnetic funnel 6 sensors 5 are installed, they register the granule coordinates in space up to their deposition into the molten pool. Information on the granules is registered by sensors 5 with certain frequency per second from the location of falling from the hopper to the location of deposition into the bath melt. Information is processed by software, introducing corrections with the same frequency through the control signals to all devices effecting the component additive fabrication process. Beam 2 is controlled as per the software according to the similar design via a focusing electromagnetic lens 12 and a deflecting electromagnetic lens 13. Turning of table 23 change the coordinates on Y axis as per the software. The table is installed on the screw 24, which may be lowered or raised as per the control software thus changing the Z axis coordinates. The substance deposition is in vacuum created via nozzle 25. If required the substance deposition is possible in any gas.

Figure 4:
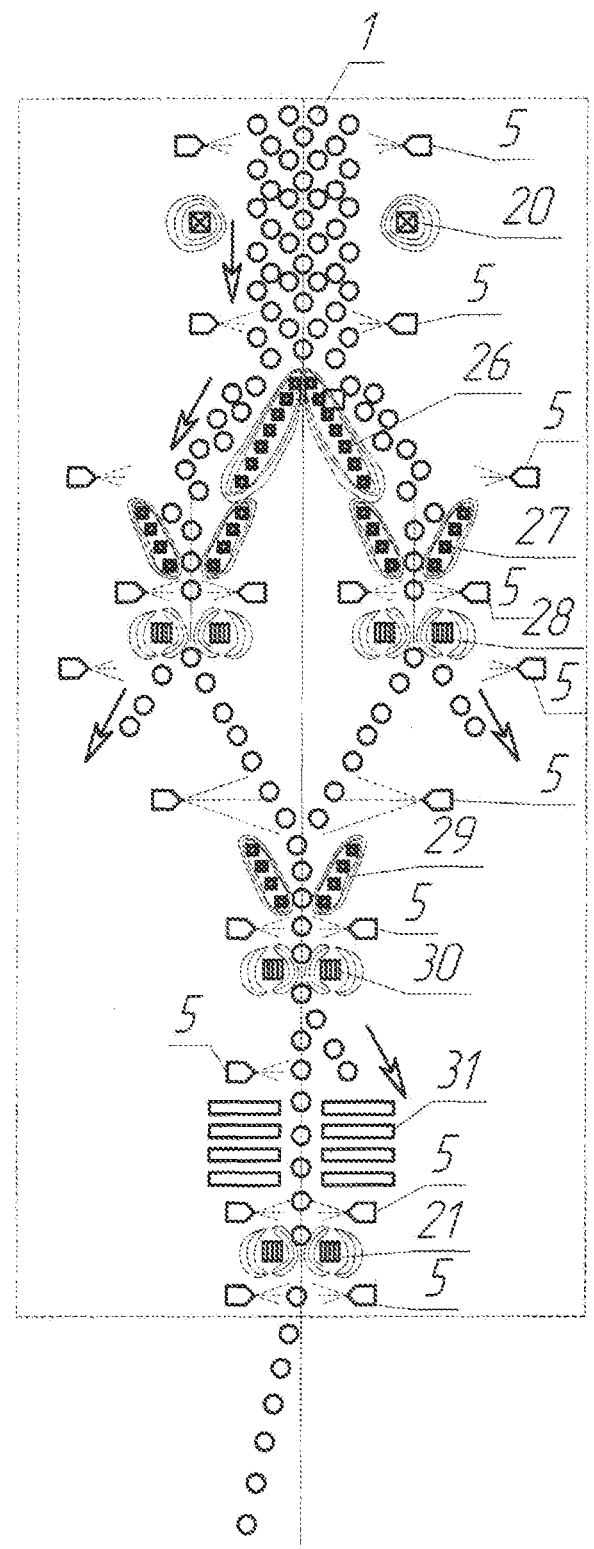
FIG. 4 shows an example of a device where devices allowing more accurate impact on the path and other granule parameters are installed at the area between the focusing inductor and the deflecting inductor.

For higher determination accuracy and granule control use of more focusing, deflecting, slowing down, accelerating and sorting devices may be resorted for the substance. FIG. 4 shows an example of a similar device where devices allowing more accurate impact on the path and other granule 1 parameters are installed at the area between the focusing inductor 20 and the deflecting inductor 21. This set of devices determines various granule parameters more accurately. The required parameters of granules getting into and out of the focusing inductor 20 are registered by instruments 5 and then directed to the splitting inductor 26 which divides the flow into several granule flows trapped by circumferential funnels 27 installed around the splitter. Prior to the circumferential funnels and after them the instruments determine the parameters of each granule flow allowing more accurate monitoring of certain flow parameters. Then each flow gets into the second deflecting inductors 28, which sort the granules and send one portion to the hopper and another to the bath melt. The more circumferential funnels with deflecting inductors are installed the higher is the process control accuracy of the substance feeding for the solid component formation. After the deflecting inductors the desired amount of granules gets into the collecting inductor 29, after which the third deflecting inductor 30 is installed; its function is more accurate sorting of granule quantity fed for the component fabrication.

The final sorted granule flow gets into the accelerating-decelerating inductor 31, where the granule acquires the desired flying speed and gets to the deflecting inductor 21 at the output.

This example shows that the system assembled from the focusing and the deflecting inductors 20 and 21 may be more complicated due to additional similar device introduction. However such complication allows multiple accuracy increase for the substance monitoring and movement in electromagnetic field. FIG. 4 shows that each device is equipped with sensors 5, the number of which at this section is increased from two to ten. The number of control inductors and monitoring instruments for a particular additive machine is selected based on economic considerations and the current task with regard to the component fabrication accuracy. These devices allow the granule flow transformation in the course of falling into the bath melt both into a solid line of required section similar to a solid wire or a cut line of granules where the area and the length of continuous areas consisting of granules are preset as well as distances between the granule areas.

The above control circuits are intended for metals and nonmetals, where currents may be induced in granules with electromagnetic field generated around them. To control the flow of nonmetal granules, where it is difficult to accomplish, the design allowing the control of their path in electromagnetic field shall be used. For that end a neutral granule has to acquire a positive or a negative charge. A nonmetal particle in the form of a granule may be charged due to friction, radiation or direct connection to an electron or proton particle.

Figure 5A:
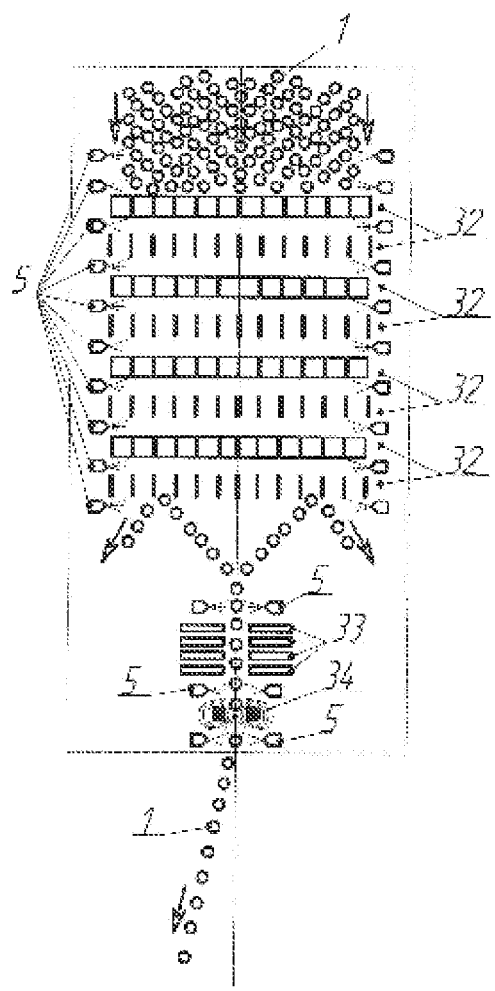
FIG. 5a shows granules falling between vertical plates of deflecting condensers, which may be represented by two vertical planes of plates assembled into a grid structure, and be located in rows creating various intensity between the two planes.
Figure 5B:
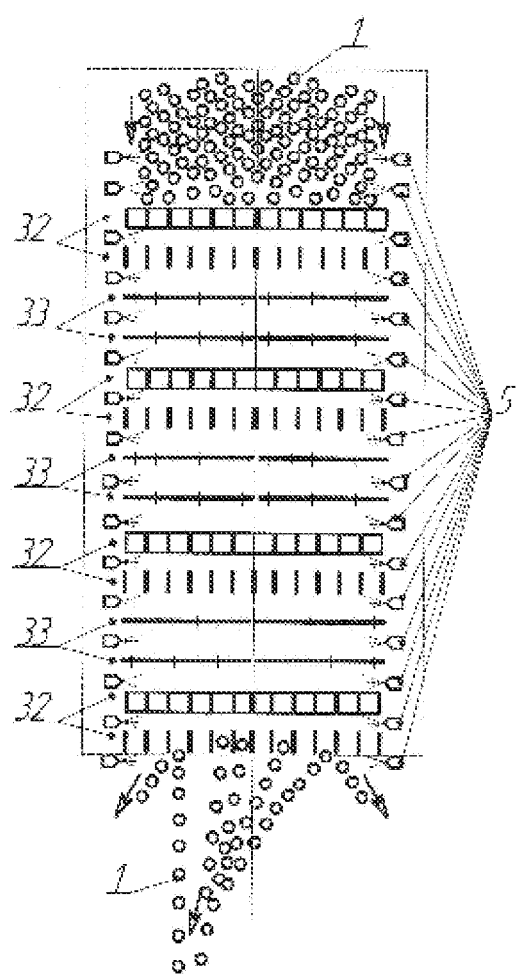
FIG. 5b shows a design using only rows of the deflecting condensers consisting of vertical plates alternating with rows of decelerating-accelerating horizontal condensers consisting of horizontal plates for the granule path direction and falling rate change.

To control a charged particle a device shown in FIGS. 5a-5b may be used. In FIG. 5a granules 1 fall between vertical plates of deflecting condensers 32, which may be represented by two vertical planes of plates assembled into a grid structure, and be located in rows creating various intensity between the two planes. Eventually a device is constructed consisting of condenser plates in the form of a grid covering all the area through which the granules fall. The granule passing through the plates as affected by the electromagnetic field may descend horizontally its path to the set point. At the input and output of the condenser row the charged granule falling path parameters are monitored with the instruments. At the output from a line-type vertical condenser system functioning as a sorting and path deflecting device, the granules in certain amount are sent aside or for deposition into the bath melt. After the vertical deflecting condensers the granule flow collected all over the area gets into the accelerating—decelerating row of horizontal condensers 33 located in the central part. The horizontal condenser 33 is assembled of several ring plates with a hole, which plane is normal to the granule falling path. Between every two plates various field intensities may be created by their connection to various fields, therefore the granule falling process may be accelerated or decelerated. Then a granule flow stabilized with regard to a granule falling rate gets through a a deflecting coil 34, which sends the granules to the set point.

FIG. 5b shows a design using only rows of the deflecting condensers 32 consisting of vertical plates alternating with rows of decelerating-accelerating horizontal condensers 33 consisting of horizontal plates for the granule path direction and falling rate change.

Thus the movement path and speed may be impacted by the use of both alternating and direct electromagnetic field.

Device designs shown in FIG. 4 and FIGS. 5a-5b may be of different configurations due to the use of various proposed design combinations.

To extend the direct material deposition method capabilities in electromagnetic field the equipment may be provided with several hoppers from which the material of the same or various fractions and chemistry is fed. Use of several sources of material feed into the bath melt allows increased weighing accuracy, feed rate, but above all it allows creation of composite components by combining feeding of various materials.

Figure 6:
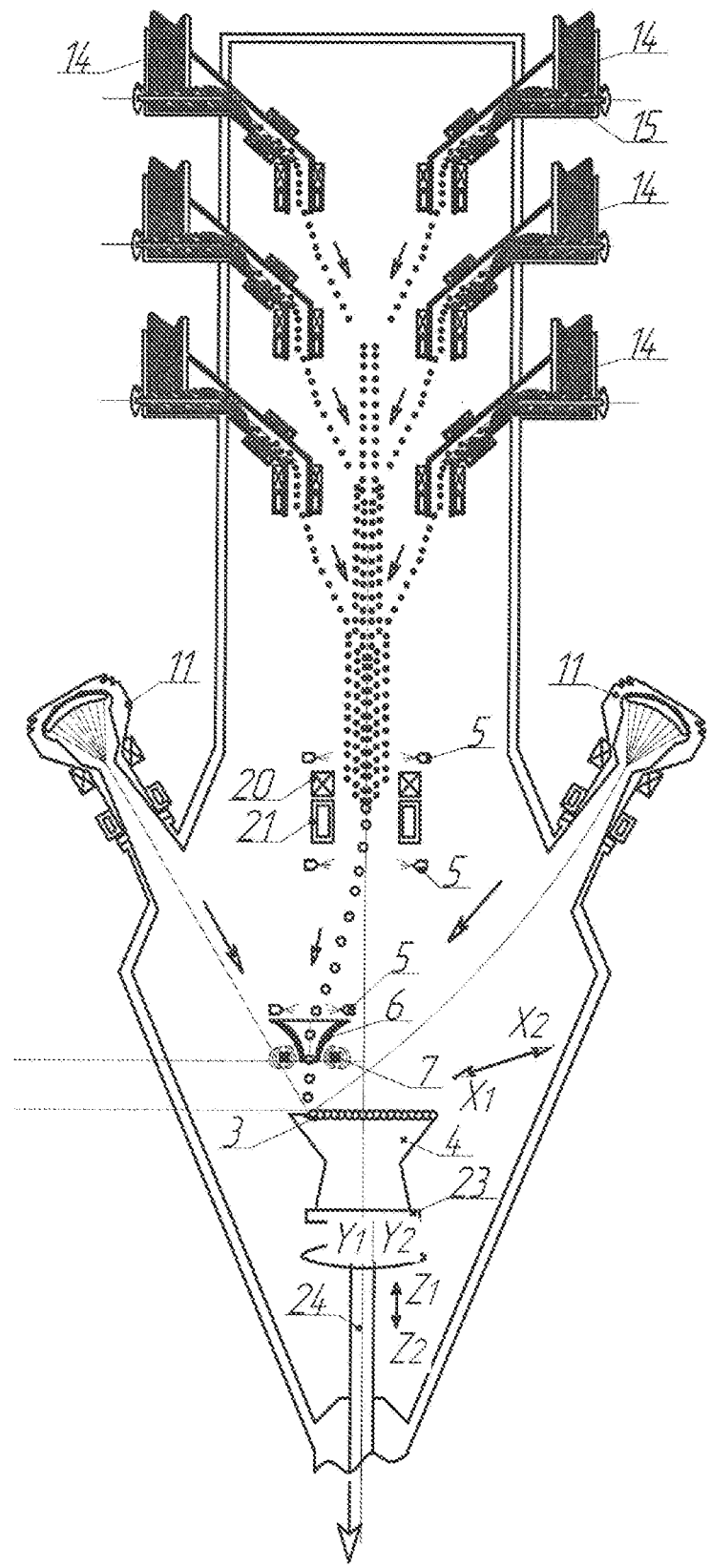
FIG. 6 shows the device design for conventional or composite component manufacture.

FIG. 6 shows the device design for conventional or composite component manufacture. The device design is similar to that shown in FIG. 3, however it allows using the substance of different materials with simultaneous or consistent deposition of various fraction and chemistry granules possible. The device includes several electron beam guns 11, several loading hoppers 14 with an independent feed control system for the granules which at the moment and in the quantity as required get to the body of component 4 set point. In FIG. 6 the focusing inductor 20 and the deflecting inductor 21 system is used as an example, the granules get there and then to the electromagnetic funnel 6 with the deflecting electromagnetic contour 7 and to the bath melt 3. The bath melt may be melted by one or several beams depending on the component complexity, deposit material rate and weight. An additional beam (or beams) allow the granule fusing or reheating to the set temperature at the approach to the bath melt. The additional beam allows melting or fusing of the granules deposited on the component surface thus enhancing the equipment capabilities.

The additive fabrication rate on the device shown in FIG. 6 may be improved if a component is formed at the substance deposit on several radii simultaneously, i.e. in different angle sectors of the circle area.

All impacts on the substance and the beam are caused by electromagnetic fields what allows monitoring of the component formation process with the maximum possible rate. Device designs shown in FIGS. 1a-6 reveal the method mechanism and demonstrate extensive capabilities of various modification equipment creation for the component fabrication.

The presented device allows high rate additive component fabrication. For example, if the granules fall from the height of two meters into the bath melt, they develop the rate of 6.26 m/sec under the gravity force. Suppose that considering the granule slowdown and flight path curving in the electromagnetic field the falling rate will reduce to 4.5 m/sec. Let's assume that the area of material deposition into the bath melt is 1 $mm^2$ with the material falling in a solid stream, so in one second the solid component volume will be increased by 4.5 $cm^3$. To deposit this amount the corresponding amount of the bath melt needs to be generated in a second. Assume that the bath melt volume will comprise half of the deposit substance volume, i.e. 2.25 $cm^3$. If titanium is used as the substance, it is known, that when melting with a 1 MW electron beam the amount of material melted in one minute will comprise 12 kg. Thus, creation of a bath melt with the volume of 2.25 $cm^3$ per second will require the beam power of 50.6 kW.

The titanium component mass growth rate will comprise 20.25 grams per second, 1215 grams per minute and 72.9 kg per hour. Such rate of additive manufacturing method of components is quite high and exceeds the rate of component fabrication by machining.

Currently the state-of-the-art technologies allow computer processing of a signal passing through a switch box with the frequency of 10000 Hz. This allows very accurate flight monitoring of a granule released from the two-meter height and moving with the average rate of 2.25 m/sec. The flight time comprises 0.9 sec., therefore the flight will be monitored with the time frequency of $8.8 \cdot 10^{-5}$ sec, at that the granule flight path may be registered at an average length section of 0.18 mm. For a modern computer equipment the granule flight will be practically "frozen" in time, what allows very accurate aiming and path adjustment and therefore more accurate and rapid additive component formation with the substance deposition under the magnetic field control.

The control method of the substance and the beam in vacuum or gas medium by electromagnetic fields opens significant prospects for additive process development which are not available for the prototypes.

REFERENCES

[1]. V. M. Dovbysh, P. M. Zabednov, M. A. Zelenko—Article. Additive Processes and Metal Products, [electronic resource] http://nami.ru/uploads/docs/centr_technology_docs/55a62fc89524bAT_metall.pdf/

[2]. A. M. Kulish, 4-th year student, Laser Processes in Engineering, Moscow State Technical University named after N. E. Bauman—Article. Use of Additive Processes for Engineering Component Manufacture, All-Russia R&D Student Conference Studencheskay Nauchnay Vesna 2015: Engineering

[3]. A. G. Grigoriants, A. I. Misurov—Capabilities and Prospects of Laser Clad Deposit. Engineering, 2005, No. 10 p. 52-56.

[4]. A. A. Fogel—Induction Method of Liquid Metal Suspension/edited by A. N. Shamov—Ed. 2, amended—L.: Mashinostroenie, Leningrad Division, 1989. (page 167; 174-181).

[5]. O. F. Kabardin O. Ф.—Physics: Alloy. Materials: Student Text Book.—Ed. 4.—M.: Prosveshenie: AO "Training Literature", 1996. (p. 3; 5-11)

The invention claimed is:

1. An additive manufacturing method of components in accordance with a set program, the method comprising:
    forming a body of a component by direct deposition of a substance in a form of granules of metal or non-metal, wherein, during the direct deposition, the substance continuously falls from a height from a reservoir through a dispenser under the force of gravity and without a gas flow, the falling of the substance being controlled by an alternating or direct electromagnetic field and being directed in a vacuum to a bath melt where the substance subsequently crystallizes, the substance when falling being heated or melted over a surface at an approach to the bath melt by the alternating or direct electromagnetic field to impart to the granules thermal energy, the dispenser being configured to direct the substance into the bath melt, the bath melt being produced by heat energy of at least one laser or electron beam;
    adjusting a path and rate of said substance in the vacuum to reach the desired bath melt location by acting on neutral and/or charged ones of said granules with the alternating or direct electromagnetic field using at least two electromagnetic devices realized in the form of an electromagnetic coil with windings to stabilize granule flow along desired paths in the dispenser for substance orientation, wherein said electromagnetic coil is attached to the dispenser; and
    changing an incidence angle of the falling substance, after the dispenser and into the bath melt, and changing a flight path geometry to a predetermined radius via at least one inductor in the form of an electromagnetic funnel installed at a distance from a support table, wherein the electromagnetic funnel is configured to direct the granules in electromagnetic field into the bath melt.

2. The method according to claim 1, wherein the granules at an approach to the bath melt are remelted so that either when the granules are deposited in the bath melt an outer part of said granules are crystallized and an inner part of said granules are molten, or when the granules are deposited in the bath melt an outer part of said granules are molten and an inner part of said granules are crystallized.

3. The method according to claim 1, wherein the substance path and rate are adjusted in accordance with the set program to reach the desired bath melt location.

4. The method according to claim 1, wherein the granules have nonhomogeneous chemical compositions and diameters.

5. The method according to claim 1, wherein the incidence angle of the falling substance is changeable, and the flight path geometry is further changeable, via an electromagnetic deflecting contour located downstream of the electromagnetic funnel.

6. The method according to claim 5, wherein the electromagnetic funnel and the electromagnetic deflecting contour are movable in accordance with the set program to move to desired set points in a solid component construction space.

7. The method according to claim 5, wherein the electromagnetic funnel and the deflecting contour through which an electron beam melting the bath melt is passed are movable at predetermined set points to coordinate the melting and falling of the substance.

8. The method according to claim 1, wherein granules of differing chemical compositions and diameters are usable with the direct deposition, and wherein positive and negative charges are obtainable for the granules.

* * * * *